G. WINKLER.
METHOD AND DEVICE FOR HANDLING PRESERVING JARS.
APPLICATION FILED SEPT. 8, 1920.
1,415,618. Patented May 9, 1922.
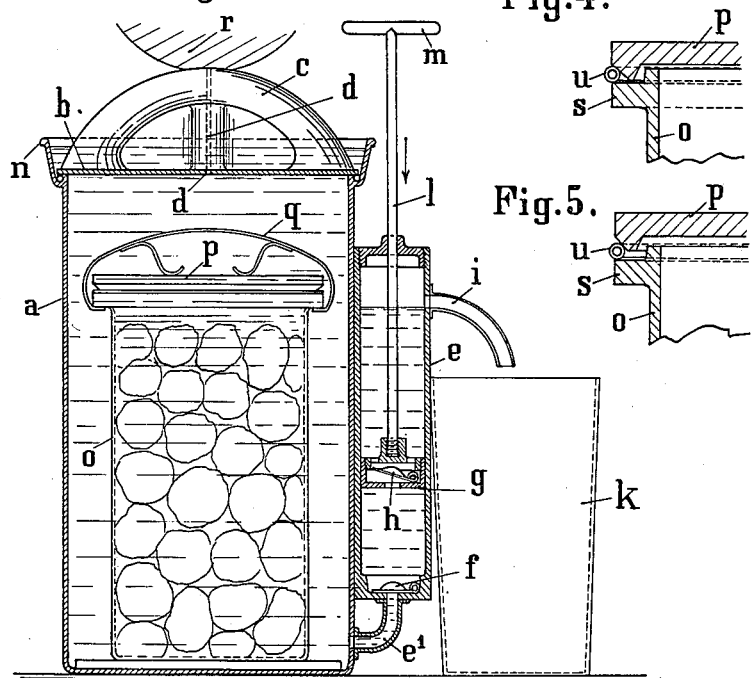
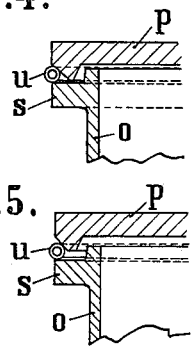
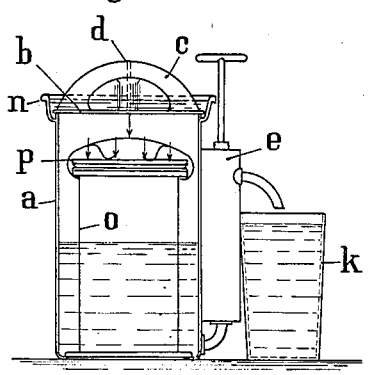
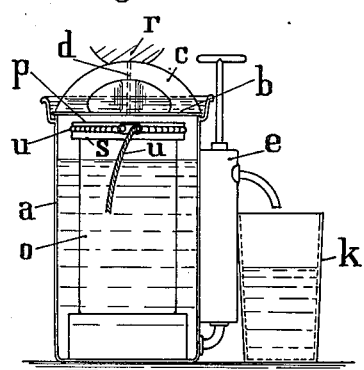
Inventor:
Gustav Winkler
by [signature]
Attorney.

UNITED STATES PATENT OFFICE.

GUSTAV WINKLER, OF DESSAU, GERMANY.

METHOD AND DEVICE FOR HANDLING PRESERVING JARS.

1,415,618.  Specification of Letters Patent.  Patented May 9, 1922.

Application filed September 8, 1920. Serial No. 409,014.

*To all whom it may concern:*

Be it known that I, GUSTAV WINKLER, a citizen of the German Empire, residing at Dessau, Germany, have invented certain new and useful Improvements in Methods and Devices for Handling Preserving Jars, of which the following is a specification.

My invention refers to methods and devices for preserving, and more especially to a method and a device for removing the air and for closing and opening preserving jars and similar vessels by means of vacuum in an auxiliary receptacle.

The methods and devices hitherto known and employing vacuum for removing the air from preserving jars and the like, as well as for closing and opening them, have not been generally adopted for use in the household and this more especially because it is very difficult to keep the auxiliary receptacles in which the jars are placed, and the devices for sucking off the air permanently tight, so that only a poor preservation of the substances to be preserved is achieved and much energy and time is consumed.

My invention which aims at overcoming these drawbacks, consists in a modification of the methods already known, in such a way that the air still remaining in the auxiliary receptacle after the preserving jars, filled up and closed in a watertight manner, have been placed in the same, is displaced by some liquid, as, for instance, water; and in this liquid being sucked off forcibly and by jerks after the receptacle has been closed, thereby achieving a removal of air from the substances to be preserved and from the preserving jars sufficing for keeping the preserves for a longer period of time, with a minimum consumption of time and energy without an apparatus constructed particularly carefully being required for the purpose.

I am aware that it is old in the art of preserving substances to remove the liquid from a receptacle filled with liquid, and to suck off liquids or gases from other spaces by means of a vacuum produced as above.

In comparison with this the new departure in my invention consists in the preserving jars after filling being placed directly in the liquid serving to remove the air, and in their being surrounded and covered by the same and furthermore in the said liquid being sucked off forcibly and by jerks. Owing to the auxiliary receptacle being filled entirely with liquid, only water need be pumped off for removing the air from the fruit to be preserved, and a more thorough removal of the air is achieved by sucking it off forcibly than by simply letting the water off in accordance with the methods hitherto known. Sucking the liquid off by jerks produces the effect that no water can penetrate into the interior of the preserving jars in the course of removing the air, because in the return stroke of the piston a small amount of positive pressure which presses down the lids of the preserving jars, occurs each time. With this new method preserving jars and the like can not only be ridded of air and closed, but also be opened again.

In the drawings affixed to this specification and forming part thereof, a device for the performance of the process and embodying my invention is illustrated by way of example. In the drawings Fig. 1 is a vertical section of the device ready for removing the air from the preserving jar and for closing the same, Fig. 2 is a section of the device after completing the removal of the air and ready for admitting the air into the receptacle, Fig. 3 is a similar view of the device at the moment of opening the preserving jar, Figs. 4 and 5 are vertical sections of the upper part of the preserving jar with the lid and the belt consisting of a coiled spring shown in two positions.

Referring to the drawings, the auxiliary receptacle $a$ (Fig. 1) is provided with the lid $b$ placed loosely on a packing-ring, the said lid being provided with a handle $c$ and a hole $d$ serving to let in the air. A water pump $e$ is attached to the receptacle $a$ by means of a suction pipe $e^1$. The piston $g$ contains the check valve $h$, whilst the suction valve $f$ is located at the bottom of the pump. The water pumped off, flows into the beaker $k$, through the bend $i$. The pump is worked by hand by means of the piston-rod $l$ and the handle $m$. The receptacle $a$ at the top possesses an enlarged rim $n$, in which the lid $b$ is placed and also covered over with water up to the edge $n$ after the preserving jar $o$ has been placed in the receptacle $a$ and the latter has been filled entirely with water. After laying the hand $r$ on the handle $c$ of the lid for counterpressure, thus at the same time closing the boring $d$, the pumping off of the water is now proceeded with until the piston works with difficulty and tends to rebound. The lid $p$ of the preserving jar $o$ in the course of this is pressed down lightly by a clamping spring $q$ so that no water can enter. Despite this clamping spring the removal of air from the preserving jar takes place in the course of tapping off the water and can be regarded as finished on the piston rebounding, without its being necessary to watch a vacuum gauge. On the hand being removed from the handle $c$ of the lid (Fig. 2) the air flows into the receptacle $a$ through the hole $d$ and presses down the lid $p$. The lid $b$ can now also be removed and the closed glass jar $o$ can be taken out.

In a similar manner glass jars for preserving can also be opened again. For this purpose the preserving glass $o$ to be opened is placed in the receptacle $a$ (Fig. 3) after a spring, preferably a belt consisting of a coiled spring $u$ (Figs. 3 and 4), has previously been inserted in the joint between the lid $p$ and the edge of the glass $s$ under tension. The receptacle is now filled entirely with water and the lid $b$ covered with water, whereupon the water is pumped from the receptacle $a$, in the course of which process the aperture $d$ is kept closed with the hand. As soon as the same degree of vacuum is attained in the receptacle $a$ as that prevailing in the preserving glass, the belt spring $u$ enters further into the joint between the glass jar and the lid, thereby lifting up the lid $p$ (Fig. 5). If air is now let into the receptacle, the lid $p$ can no longer close.

The receptacle consists of metal, its lid $b$ is, however, made of glass. For purposes of strengthening, the lid $b$ is provided with a bow-piece $c$ which simultaneously serves as a handle and as a support for the hand during the pumping and which contains the hole $d$ for letting in the air. In this manner a cock for letting in the air as contained in the devices hitherto known can be dispensed with.

I claim:

1. The method which consists in surrounding a superficially closed preserving receptacle within a closed container with a suitable liquid and forcibly pumping some of said liquid from said container.

2. The method which consists in placing a superficially closed preserving receptacle within a container, filling said container with a suitable liquid, closing said container, displacing the air still present therein by liquid and forcibly and by jerks pumping some liquid from said container.

3. In a device of the kind described in combination, a container, a cover for said container, a grip on said cover, a boring laid through said grip and said cover, a seat for said cover below the upper edge of said container and a liquid pump connected with said container.

In testimony whereof I affix my signature.

GUSTAV WINKLER.